United States Patent
Suzuki et al.

(10) Patent No.: US 10,433,231 B2
(45) Date of Patent: Oct. 1, 2019

(54) TERMINAL AND HANDOVER JUDGEMENT METHOD

(71) Applicant: Panasonic Intellectual Property Corporation of America, Torrance, CA (US)

(72) Inventors: Masaaki Suzuki, Kanagawa (JP); Hidetoshi Suzuki, Kanagawa (JP); Ayako Horiuchi, Kanagawa (JP); Masayuki Hoshino, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 122 days.

(21) Appl. No.: 15/160,561

(22) Filed: May 20, 2016

(65) Prior Publication Data

US 2016/0269967 A1  Sep. 15, 2016

Related U.S. Application Data

(63) Continuation of application No. PCT/JP2015/000145, filed on Jan. 15, 2015.

(30) Foreign Application Priority Data

Jan. 31, 2014 (JP) ................................ 2014-017127

(51) Int. Cl.
  *H04W 4/00* (2018.01)
  *H04W 36/36* (2009.01)
  (Continued)

(52) U.S. Cl.
  CPC ........... *H04W 36/36* (2013.01); *H04W 16/32* (2013.01); *H04W 36/0088* (2013.01);
  (Continued)

(58) Field of Classification Search
  CPC ..................................................... H04W 36/36
  See application file for complete search history.

(56) References Cited

U.S. PATENT DOCUMENTS

| 9,900,872 B2 * | 2/2018 | Liu | H04W 72/042 |
| 2012/0157101 A1 * | 6/2012 | Uemura | H04L 5/001 455/436 |

(Continued)

FOREIGN PATENT DOCUMENTS

WO  2013/024574  2/2013

OTHER PUBLICATIONS

International Search Report of PCT application No. PCT/JP2015/000145 dated Apr. 21, 2015.

(Continued)

*Primary Examiner* — Gerald A Smarth
(74) *Attorney, Agent, or Firm* — Seed IP Law Group LLP

(57) ABSTRACT

In a terminal that judges whether to trigger a handover from a serving cell to another cell, a RSRQ/RSRP measurer measures a first received quality value by using a cell-specific reference signal transmitted from the neighboring cell or a second received quality value by using a cell-detection reference signal transmitted from the neighboring cell. An offset adder calculates a third received quality value by adding an offset value to the second received quality value. A judging circuitry judges whether the first received quality value or the third received quality value satisfies a handover triggering condition with reference to the cell-specific reference signal. A transmitter transmits trigger information to the neighboring cell in order to activate handover from a serving cell to the neighboring cell, based on the judgement results.

5 Claims, 7 Drawing Sheets

(51) Int. Cl.
- *H04W 16/32* (2009.01)
- *H04W 36/00* (2009.01)
- *H04W 36/04* (2009.01)
- *H04L 5/00* (2006.01)

(52) U.S. Cl.
CPC ..... *H04W 36/00837* (2018.08); *H04W 36/04* (2013.01); *H04L 5/0048* (2013.01)

(56) References Cited

U.S. PATENT DOCUMENTS

| | | | | |
|---|---|---|---|---|
| 2012/0282864 | A1* | 11/2012 | Dimou | H04W 36/22 455/67.14 |
| 2013/0079049 | A1* | 3/2013 | Yu | H04W 48/16 455/524 |
| 2013/0157665 | A1* | 6/2013 | Toda | H04W 36/30 455/436 |
| 2014/0029455 | A1* | 1/2014 | Vitthaladevuni | H04W 24/02 370/252 |
| 2014/0092866 | A1* | 4/2014 | Teyeb | H04W 76/045 370/331 |
| 2014/0126545 | A1 | 5/2014 | Tamura et al. | |
| 2014/0177601 | A1* | 6/2014 | Nishio | H04W 24/10 370/332 |
| 2015/0118968 | A1* | 4/2015 | Nory | H04W 36/00837 455/67.11 |

OTHER PUBLICATIONS

3GPP TSG-RAN WG1 Meeting 77, R1-142279, Broadcom Corporation, "RSRQ calculation for small cell On/Off", May 2014.

3GPP TS36.331 V11.6.0, "Evolved Universal Terrestrial Radio Access (E-UTRA); Radio Resource Control (RRC) Protocol specification (Release 11)", Dec. 2013.

3GPP TS36.211 V11.4.0, "Evolved Universal Terrestrial Radio Access (E-UTRA); Physical channels and modulation (Release 11)" Sep. 2013.

3GPP TSG RAN WG1 Meeting, R1-133457, NTT DOCOMO, "Small Cell Discovery for Efficient Small Cell On/Off Operation" Aug. 2013.

3GPP TR 36.842 V1.0.0, "Study on Small Cell Enhancements for E-UTRA and E-UTRAN—Higher layer aspects (Release12)" Nov. 2013.

3GPP TSG-RAN WG2 Meeting, R2-134188, NSN, Nokia Corporation, "On the need of PCell functionality in SeNB" Nov. 2013.

* cited by examiner

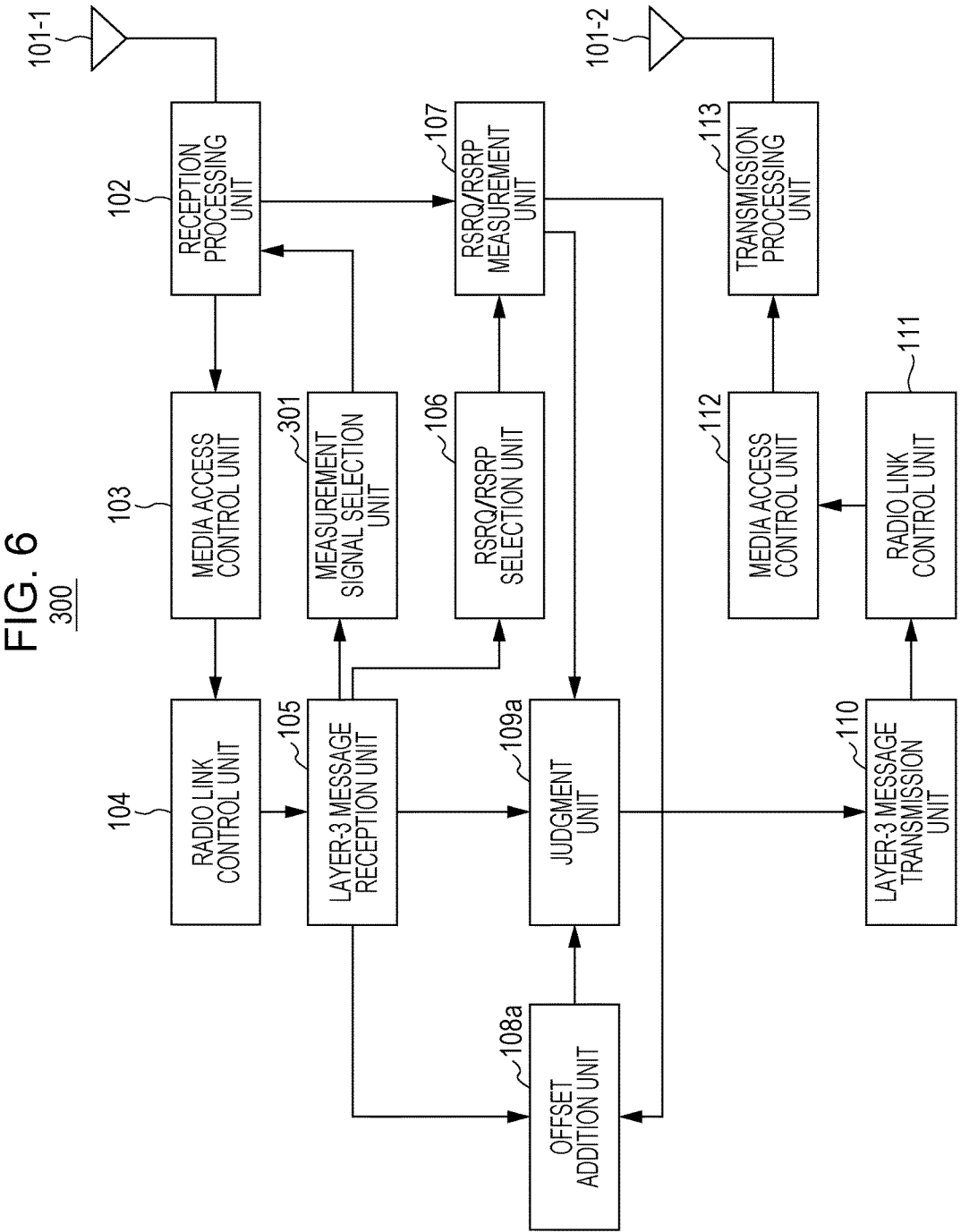

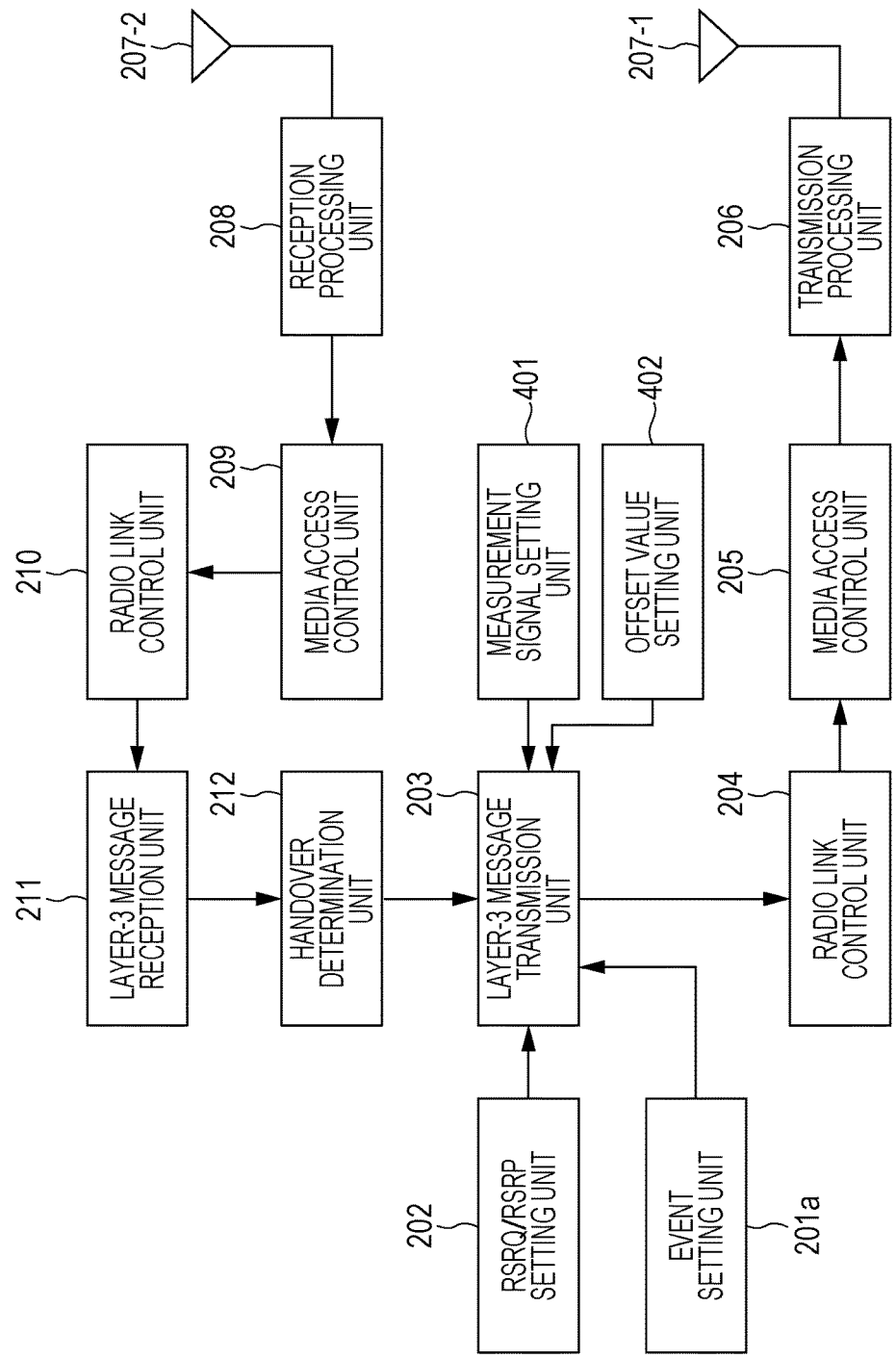

TERMINAL AND HANDOVER JUDGEMENT METHOD

BACKGROUND

1. Technical Field

The present disclosure relates to a terminal and a handover judgement method.

2. Description of the Related Art

Measurement Events

In LTE-Advanced system, which is an extension of 3GPP-LTE (3rd Generation Partnership Project Radio Access Network Long Term Evolution), a terminal (also referred to as user equipment (UE)) performs an operation described below. That is, when the terminal tries to change (make a handover) a base station (also referred to as a cell or eNB) to which the terminal is connected, the terminal measures reference signal received quality (RSRQ) of a cell-specific reference signal (CRS) transmitted from a base station that is a handover candidate cell, or reference signal received power (RSRP).

The terminal then judges an occurrence of one of measurement events including a threshold event and a comparison event as described below. For example, the terminal judges whether RSRQ/RSRP of a handover candidate cell has become greater than a threshold value (threshold event), or whether RSRQ/RSRP of the handover candidate cell has become greater than a value equal to RSRQ/RSRP of a cell to which the terminal is being connected (that is, a base station to which the terminal is being connected (also referred to as a serving base station (cell)) plus an offset value (comparison event). When a measurement event occurs, the terminal reports the occurrence of the measurement event (trigger of a handover) to the serving cell. When the base station receives the report of the occurrence of the measurement event, the base station performs a handover for the terminal (for example, see 3GPP TS36.331v11.6 (2013-09), "Evolved Universal Terrestrial Radio Access (E-UTRA); Radio Resource Control Protocol (Release 11)", September 2013 (hereinafter referred to simply as NPL 1).

The type of the measurement event, parameters such as the threshold value used in the measurement event, the offset value, and the like, and a measured value (RSRP or RSRQ) used in the measurement event are set by the base station to the individual terminal.

Discovery Signal for Small Cell

In LTE-Advanced, it is under consideration to dispose a small cell which is a base station with a relatively low transmission power in a coverage area of a macrocell which is a base station with a relatively high transmission power thereby handling increasing traffic.

When a small cell is introduced, to suppress interference from the small cell and to reduce consumption power of the small cell, it is under consideration to control switching between an on-state and an off-state of the small cell (hereinafter referred to simply as the on/off control). In the off-state, the small cell is in a "hibernation state" in which no data is assigned to terminals. However, if transmission of all signals from the small cell is stopped, it becomes impossible for terminals to detect the small cell. To handle the above situation, it is under consideration to transmit a cell detection reference signal (hereinafter also referred to as a discovery signal) from the small cell thereby making it possible for terminals to detect the small cell even in the off-state.

In controlling the handover, the discovery signal is used, as with CRS, for measuring RSRQ/RSRP. However, to suppress the consumption power, it is under consideration to reduce the repletion frequency of transmission (to increase the transmission interval) of the discovery signal compared with CRS. Furthermore, as design of the discovery signal, it is under consideration to change the repletion period, the band, or the like of an existing signal used in the LTE-Advanced system thereby using it as the discovery signal. Candidates for a signal used as the discovery signal includes PRS (Positioning Reference Signal), CSI-RS (Channel-State Information Reference Signal), etc. (see, for example, 3GPP TS36.211v11.4.0 (2013-09), "Evolved Universal Terrestrial Radio Access (E-UTRA); Physical channels and modulation (Release 11)", September 2013, and 3GPP TSG RAN WG1 meeting, R1-133457, NTT DOCOMO, "Small Cell Discovery for Efficient Small Cell On/Off Operation", August 2).

To suppress the consumption power, cells being in the off-state transmit only the discovery signal and transmits no other signal such that only terminals supporting RSRQ/RSRP measurement using the discovery signal (for example, terminals supporting the LTE standard Rel. 12) are allowed to detect cells in the off-state. On the other hand, cells in the on-state transmit the discovery signal and CRS, even terminals that do not support the RSRQ/RSRP measurement using the discovery signal (for example, terminals supporting the LTE standard Rel. 11 or older versions) are allowed to detect cells in the on-state.

SUMMARY

However, the introduction of the discovery signal may cause a terminal to have to re-measure RSRQ/RSRP or may cause it to have to set a new threshold value, and thus a delay in controlling the handover may occur when the conventional technique is used.

One non-limiting and exemplary embodiment provides a terminal and a handover judgement method capable of controlling the handover without a delay using the existing measurement event technique even in the situation in which the discovery signal is introduced.

In one general aspect, the techniques disclosed here feature that a terminal comprising a measurement unit that measures a first received quality value by using a cell-specific reference signal transmitted from a neighboring cell or a second received quality valueby using a cell-detection reference signal transmitted from the neighboring cell, an addition unit that calculates a third received quality value by adding an offset value to the second received quality value, and a judgment unit that judges whether the first received quality value of the neighboring cell or the third received quality value satisfies a handover triggering condition with respect to the cell-specific reference signal, and a transmitter that transmits trigger information to the neighboring cell in order to activate handover from a serving cell to the neighboring cell, based on the judgement results.

It should be noted that general or specific embodiments may be implemented as a system, a method, an integrated circuit, a computer program, a storage medium, or any selective combination thereof.

According to the present disclosure, it is possible to control the handover without a delay using the existing measurement event technique even in the situation in which the discovery signal is introduced.

Additional benefits and advantages of the disclosed embodiments will become apparent from the specification and drawings. The benefits and/or advantages may be individually obtained by the various embodiments and features

BRIEF DESCRIPTION OF THE DRAWINGS

FIG. 6 is a block diagram illustrating a configuration of a terminal according to a second embodiment of the present disclosure; and FIG. 7 is a block diagram illustrating a configuration of a base station according to the second embodiment of the present disclosure.

DETAILED DESCRIPTION

Underlying Knowledge Forming Basis of the Present Disclosure

In a comparison event, which is one of measurement events, there is a possibility that it becomes necessary for a terminal to re-measure RSRQ/RSRP, or there is a possibility that it becomes impossible for the terminal to make a judgement in the comparison event. The two cases described above are described in further detail below.

As a resource for transmitting a discovery signal, an existing signal (PRS, CSI-RS, or the like) is used. That is, a resource conventionally used for transmitting CRS used in measurement of RSRQ/RSRP is different from a resource for transmitting a discovery signal used in measurement of RSRQ/RSRP for detecting a cell which is in an off-state. Therefore, in a comparison event, it is not allowed to make a comparison between RSRQ/RSRP measured using CRS transmitted from a serving cell and RSRQ/RSRP measured using a discovery signal transmitted from a neighboring cell. Thus, it is necessary for a terminal to re-measure RSRQ/RSRP of a serving cell using a discovery signal.

Figure 1:
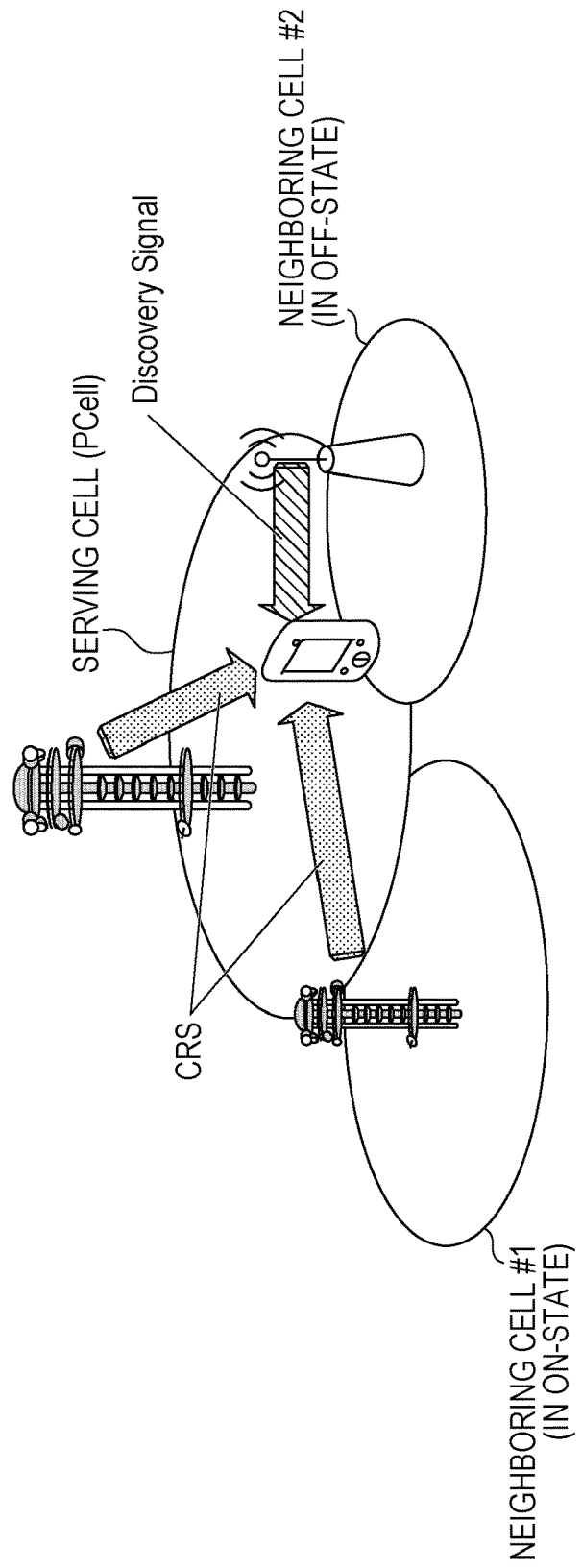
FIG. 1 is a diagram illustrating a situation in which there is a mixture of a base station that transmits CRS and base stations that transmit a discovery signal.

For example, FIG. 1 illustrates a situation in which a terminal exists in an area in which there is a mixture of cells that transmit CRS (cells being in the on-state or cells that do not support the On/Off control) and cells that transmit a discovery signal (cells being in the off-state). In FIG. 1, in a case where the terminal detects a cell being in the off-state when the terminal is measuring RSRQ/RSRP of CRS for a comparison event, it becomes necessary for the terminal to perform re-measurement of RSRQ/RSRP using the discovery signal for the cell for which the measurement of RSRQ/RSRP using CRS has been made.

The re-measurement of RSRQ/RSRP by the terminal causes a delay in the measurement event judgment. As a result, a delay occurs in triggering the handover.

On the other hand, a terminal located (connected) in a coverage area of a base station that does not support the on/off control (that is, a base station that does not transmit the discovery signal) can obtain only RSRQ/RSRP using CRS for the base station to which the terminal is being connected, and thus even if a discovery signal is detected that is transmitted from a cell being in the off-state, it is impossible to perform a comparison event judgment based on RSRQ/RSRP using the discovery signal. Therefore, it is impossible for the base station to perform a handover for this terminal.

Furthermore, in a threshold event judgment which is one of measurement event judgments, there is a case in which it is necessary to set a new threshold value. More specifically, in the existing threshold event, a threshold value (a threshold value with reference to CRS) is set for RSRQ/RSRP measured using CRS. In contrast, in the threshold event judgment for a cell being in the off-state, RSRQ/RSRP used is measured using a discovery signal. There is a difference between CRS and the discovery signal as described above, and because of this difference, an existing threshold value (a threshold value with reference to CRS) is not allowed to be used as a threshold value for judging RSRQ/RSRP measured using the discovery signal, and it is necessary to set a new different threshold value for use with the discovery signal.

Based on the above-described knowledge obtained via the investigation, the present inventors have achieved a technique of configuring a terminal in a manner described below to make it possible to control the handover, without causing a delay, using the existing measurement event technique even in the situation in which the discovery signal is introduced. That is, the terminal measures a first reference signal received quality value using a cell-specific reference signal (CRS) transmitted from a neighboring cell other than a serving cell or a second reference signal received quality value using a discovery signal (discovery signal) transmitted from the neighboring cell, calculates a third reference signal received quality value by adding an offset value to the second reference signal received quality value, and judges whether the first reference signal received quality value of the neighboring cell or the third reference signal received quality value of the neighboring cell satisfies a handover triggering condition with respect to the cell-specific reference signal.

The present disclosure is described in further detail below with reference to embodiments in conjunction with drawings. In the embodiments described below, similar components are denoted by similar reference numerals, and a duplicated explanation thereof is omitted.

First Embodiment

Outline of Communication System

A communication system according to a first embodiment includes a terminal 100 and a base station 200. This communication system is, for example, an LTE-Advanced system. The terminal 100 is, for example, a terminal supported by the LTE-Advanced system, and the base station 200 is, for example, a base station supported by the LTE-Advanced system.

In the present embodiment, it is assumed that the on/off control functionality is provided. That is, the terminal 100 is capable of receiving at least CRS from a cell being in the on-state (a serving cell and a neighboring cell #1 in the example shown in FIG. 1) or a cell that does not support the on/off control (not illustrated in the figure). Furthermore, the terminal 100 is also capable of receiving a discovery signal from a cell being in the off-state (in the example shown in FIG. 1, a neighboring cell #2). The base station 200 is, for example, a cell to which the terminal 100 is being connected, and the base station 200 performs a layer-3 control on the terminal 100. The layer-3 control is to control a radio connection between the base station 200 and the terminal 100. More specifically, for example, a type of a measurement event and a threshold value thereof are set for the terminal 100, and, in response to a report of an occurrence of an event, a handover is performed for the terminal 100.

The terminal 100 judges whether to perform a handover from a serving cell to a neighboring cell. Herein, the "neighboring cell" may be a cell that supports the on/off control described above. More specifically, for example, the "neighboring cell" may be a small cell located adjacent to the terminal 100.

Figure 2:
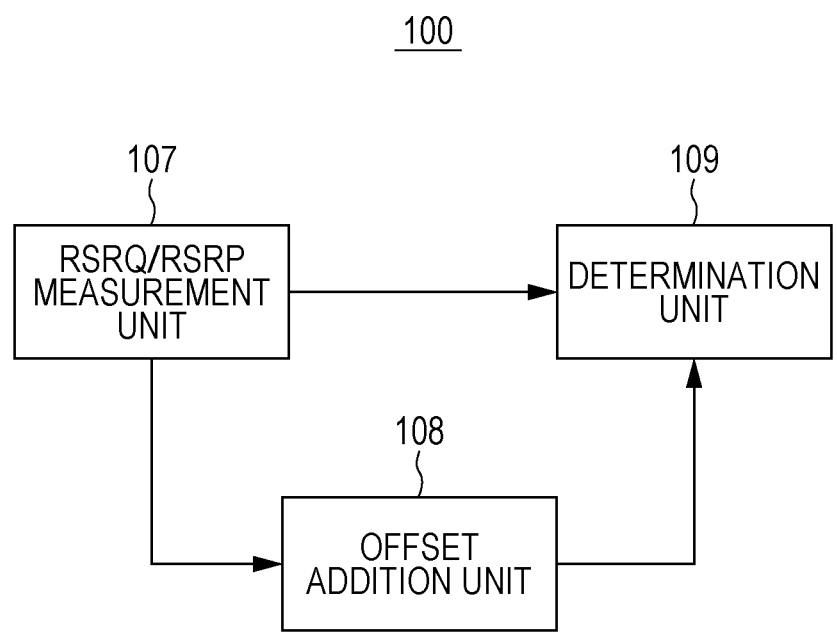
FIG. 2 is a block diagram illustrating a configuration of a terminal according to a first embodiment of the present disclosure, in which only major parts are shown.

FIG. 2 is a block diagram illustrating main parts of the terminal 100 according to the present embodiment.

The terminal 100 judges whether or not to perform a handover from a serving cell to a neighboring cell. In the terminal 100, a RSRQ/RSRP measurement unit 107 measures a first reference signal received quality value (RSRQ/RSRP) using a cell-specific reference signal (CRS) transmitted from a neighboring cell or a second reference signal received quality value (RSRQ/RSRP) using a cell detection reference signal (discovery signal) transmitted from the neighboring cell. An offset addition unit 108 calculates a third reference signal received quality value (a value corresponding to RSRQ/RSRP measured using CRS) by adding an offset value to the second reference signal received quality value (RSRQ/RSRP) measured using the discovery signal. A judgment unit 109 judges whether the first reference signal received quality value or the third reference signal received quality value satisfies a condition (measurement event) with respect to CRS to trigger a handover.

Configuration of Terminal 100

Figure 3:
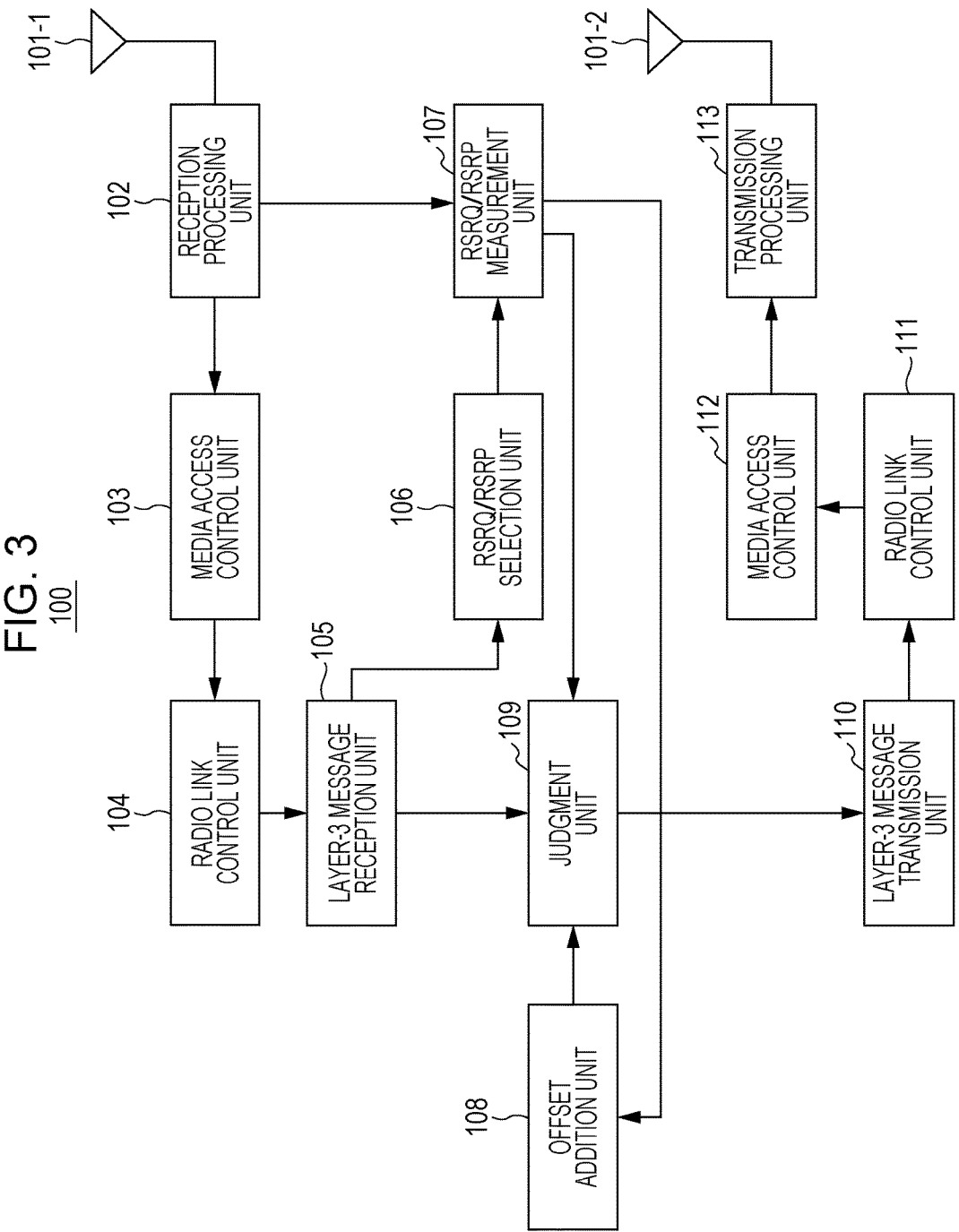
FIG. 3 is a block diagram illustrating a configuration of a terminal according to the first embodiment of the present disclosure.

FIG. 3 is a block diagram illustrating a configuration of the terminal 100 according to the present embodiment. In FIG. 3, the terminal 100 includes a receiving antenna 101-1, a transmitting antenna 101-2, a reception processing unit 102, a media access control unit 103, a radio link control unit 104, a layer-3 message reception unit 105, an RSRQ/RSRP selection unit 106, an RSRQ/RSRP measurement unit 107, an offset addition unit 108, a judgment unit 109, a layer-3 message transmission unit 110, a radio link control unit 111, a media access control unit 112, and a transmission processing unit 113.

The reception processing unit 102 performs reception processing on a signal received via the receiving antenna 101-1. The received signal includes a layer-3 message signal carrying control information for controlling the layer 3, a user data signal, or a reference signal (CRS or discovery signal) transmitted from a cell. The layer-3 message signal also includes setting of a parameter (described later) used in a measurement event judgment and setting of RSRQ/RSRP measurement indicating whether to measure RSRQ or RSRP. The reception processing unit 102 outputs a signal including the layer-3 message signal and the user data signal to the media access control unit 103, and outputs the reference signal to the RSRQ/RSRP measurement unit 107.

The media access control unit 103 demultiplexes the signal received from the reception processing unit 102 to the layer-3 message signal and the user data signal, and performs reception processing on HARK (Hybrid Automatic Repeat request). The media access control unit 103 outputs the resultant layer-3 message signal subjected to the process described above to the radio link control unit 104.

The radio link control unit 104 assembles the layer-3 message signal (layer-3 message data) received from the media access control unit 103, and performs reception acknowledgement to the cell (eNB). The radio link control unit 104 outputs the assembled layer-3 message signal to the layer-3 message reception unit 105.

The layer-3 message reception unit 105 analyzes (decodes) the layer-3 message signal and performs setting of the measurement event for the judgment unit 109 and setting of RSRQ/RSRP measurement for the RSRQ/RSRP selection unit 106.

The RSRQ/RSRP selection unit 106 instructs the RSRQ/RSRP measurement unit 107 to measure RSRQ or RSRP according to the setting of the RSRQ/RSRP measurement received from the layer-3 message reception unit 105.

According to the instruction given by the RSRQ/RSRP selection unit 106, the RSRQ/RSRP measurement unit 107 measures RSRQ or RSRP (hereinafter referred to simply as RSRQ/RSRP). Note that the RSRQ/RSRP measurement unit 107 measures RSRQ/RSRP (reference signal received quality value) using CRS transmitted from a serving cell or a neighboring cell or using a discovery signal transmitted from as a neighboring cell. More specifically, the RSRQ/RSRP measurement unit 107 measures RSRQ/RSRP using CRS transmitted from the serving cell. Furthermore, the RSRQ/RSRP measurement unit 107 measures RSRQ/RSRP using CRS transmitted from a neighboring cell or measures RSRQ/RSRP using a discovery signal transmitted from a neighboring cell. The RSRQ/RSRP measurement unit 107 outputs RSRQ/RSRP (CRS-based RSRQ/RSRP) measured using CRS to the judgment unit 109, and outputs RSRQ/RSRP (discovery signal-based RSRQ/RSRP) measured using the discovery signal to the offset addition unit 108. Note that the RSRQ/RSRP measurement unit 107 makes the judgement as to whether a neighboring cell is transmitting CRS or a discovery signal according to a detection performed by the terminal 100 or makes the judgement based on the layer-3 message from the serving cell.

The offset addition unit 108 adds the offset value to the RSRQ/RSRP (discovery signal-based RSRQ/RSRP) received from the RSRQ/RSRP measurement unit 107 and outputs the resultant RSRQ/RSRP added with the offset value to the judgment unit 109. In other words, the offset addition unit 108 converts the discovery signal-based RSRQ/RSRP to a value corresponding to the CRS-based RSRQ/RSRP. Note that the offset value is uniquely determined depending on a frequency band used by a specific cell. The terminal 100 may have a table representing the correspondence between the frequency band and the offset value and may determine the offset value B to be used according to the table, or the terminal 100 may determine the offset value B according to the layer-3 message transmitted from the serving cell (base station 100).

Using the CRS-based RSRQ/RSRP received from the RSRQ/RSRP measurement unit 107 or the discovery signal-based RSRQ/RSRP added with the offset value received from the offset addition unit 108, the judgment unit 109 judges whether RSRQ/RSRP of the neighboring cell (cell under judgment) satisfies a condition for an occurrence of a measurement event (a comparison event or a threshold event).

For example, in a case where the comparison event judgment is performed, when RSRQ/RSRP of the cell under judgment is greater than the RSRQ/RSRP of the serving cell measured using CRS, the judgment unit 109 judges that the measurement event has occurred (the condition for the occurrence of the comparison event is satisfied). In a case where the threshold event judgment is performed, when the RSRQ/RSRP of the cell under judgment is greater than the threshold value, the judgment unit 109 judges that the measurement event has occurred (the condition for the occurrence of the threshold event is satisfied). Note that RSRQ/RSRP used in the comparison event and the threshold event is CRS-based RSRQ/RSRP in a case where RSRQ/RSRP is measured using CRS by the RSRQ/RSRP measurement unit 107. On the other hand, in a case where RSRQ/RSRP is measured using a discovery signal, a value (RSRQ/RSRP) obtained by adding an offset value to the discovery signal-based RSRQ/RSRP is employed.

Note that the comparison event and the threshold event are existing measurement events defined in LTE-Advanced. That is, in the comparison event, CRS-based RSRQ/RSRP of the serving cell is used, while in the threshold event, the threshold value with respect to CRS is set. Therefore, these measurement events are CRS-based conditions for trigger a handover.

When the judgment unit 109 judges that a measurement event condition is satisfied as a result of the measurement event judgment, the judgment unit 109 instructs the layer-3 message transmission unit 110 to report that the measurement event condition has been satisfied for the cell under judgment.

When the layer-3 message transmission unit 110 receives the instruction from the judgment unit 109 to report that the measurement event condition has been satisfied, the layer-3 message transmission unit 110 generates a layer-3 message signal including the report of the occurrence of the measurement event and an identification number (physical cell ID) of the cell under judgment, and outputs the resultant layer-3 message signal to the radio link control unit 111.

The radio link control unit 111 divides the layer-3 message signal (layer-3 message data) received from the layer-3 message transmission unit 110, and performs transmission acknowledgement to the cell (eNB). The radio link control unit 111 outputs the divided layer-3 message signal to the media access control unit 112.

The media access control unit 112 multiplexes a user data signal (not shown in the figure) and the layer-3 message signal received from the radio link control unit 111, and performs a HARK transmission process. The media access control unit 112 outputs the resultant signal subjected to the above-described process to the transmission processing unit 113.

The transmission processing unit 113 performs transmission processing on the signal received from the media access control unit 112 and transmits the resultant signal subjected to the transmission processing via the transmitting antenna 101-2.

Configuration of Base Station 200

Figure 4:
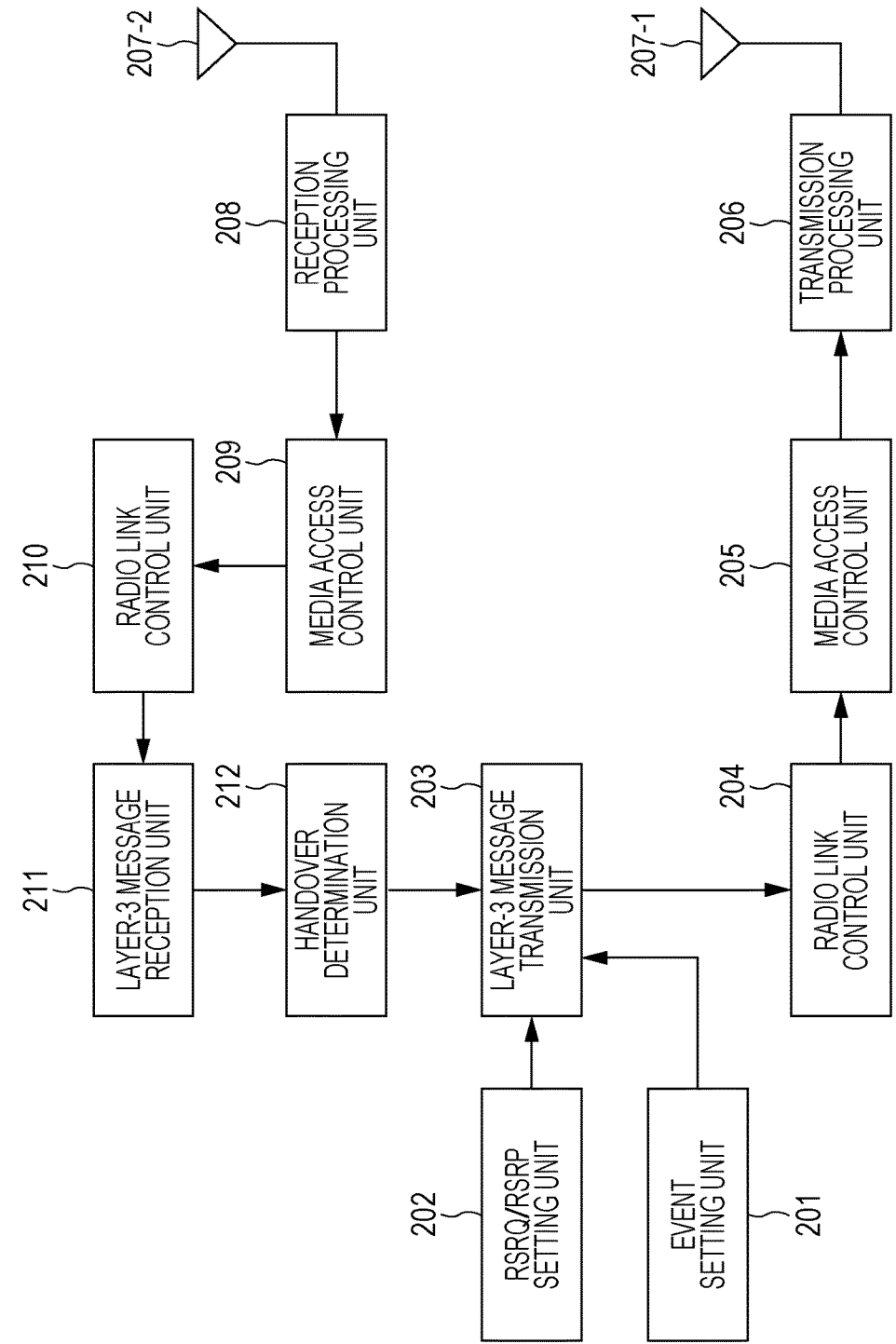
FIG. 4 is a block diagram illustrating a configuration of a base station according to the first embodiment of the present disclosure.

FIG. 4 is a block diagram illustrating a configuration of the base station 200 according to the present embodiment. In FIG. 4, the base station 200 includes an event setting unit 201, a RSRQ/RSRP setting unit 202, a layer-3 message transmission unit 203, a radio link control unit 204, a media access control unit 205, a transmission processing unit 206, a transmitting antenna 207-1, a receiving antenna 207-2, a reception processing unit 208, a media access control unit 209, a radio link control unit 210, a layer-3 message reception unit 211, and a handover judgment unit 212.

The event setting unit 201 sets a parameter (described later) used by the terminal 100 in measurement event judgment, and outputs the resultant parameter to the layer-3 message transmission unit 203.

The RSRQ/RSRP setting unit 202 sets whether RSRQ or RSRP is to be measured by the terminal 100 and outputs the resultant setting information to the layer-3 message transmission unit 203.

The layer-3 message transmission unit 203 generates a layer-3 message signal including the setting information received from the event setting unit 201 and the RSRQ/RSRP setting unit 202 or the handover message received from the handover judgment unit 212, and the layer-3 message transmission unit 203 outputs the generated layer-3 message signal to the radio link control unit 204.

The radio link control unit 204 divides the layer-3 message signal (layer-3 message data) received from the layer-3 message transmission unit 203, and performs transmission acknowledgement to the cell (eNB). The radio link control unit 204 outputs the divided layer-3 message signal to the media access control unit 205.

The media access control unit 205 multiplexes a user data signal (not shown in the figure) and the layer-3 message signal received from the radio link control unit 204, and performs a HARK transmission process. The media access control unit 205 outputs the resultant signal subjected to the above-described process to the transmission processing unit 206.

The transmission processing unit 206 performs transmission processing on the signal received from the media access control unit 205, and transmits the resultant signal subjected to the transmission processing via the transmitting antenna 207-1.

The reception processing unit 208 performs reception processing on a signal received via the receiving antenna 207-1 and outputs the resultant signal subjected to the reception processing to the media access control unit 209. The received signal includes the layer-3 message signal generated by the terminal 100 or a user data signal.

The media access control unit 209 demultiplexes the signal received from the reception processing unit 208 to the layer-3 message signal and the user data signal, and performs a HARK reception process. The media access control unit 209 outputs the layer-3 message signal subjected to the process described above to the radio link control unit 210.

The radio link control unit 210 assembles the layer-3 message signal (layer-3 message data) received from the media access control unit 209, and performs reception acknowledgement to the cell (eNB). The radio link control unit 210 outputs the assembled layer-3 message signal to the layer-3 message reception unit 211.

The layer-3 message reception unit 211 analyzes (decodes) the layer-3 message signal and outputs an analysis result to the handover judgment unit 212.

In a case where the analysis result received from the layer-3 message reception unit 212 indicates that the measurement event condition has been satisfied for the terminal 100, the handover judgment unit 212 generates a handover message to instruct the terminal 100 to perform a handover. The handover judgment unit 212 outputs the generated handover message to the layer-3 message transmission unit 203.

Operation of Terminal 100 and Base Station 200

An operation in terms of handover control performed by the terminal 100 and the base station 200 configured in the above-described manner is described below.

In the following explanation, it is assumed, by way of example, that a comparison event is set as a measurement event judgment performed by the terminal 100. As an example of a comparison event, Event A3 (neighbor becomes offset better than PCell) described in NPL 1 is explained.

More specifically, the judgment unit 109 of the terminal 100 stores a mathematical condition expression for Event A3 given by a mathematical expression (1) shown below.

$$M_{crs}+Of_n+Oc_n-Hys>M_s+Of_s+Oc_s+Off \quad (1)$$

In expression (1), Mcrs denotes a measured value of RSRQ/RSRP of a cell under judgment, Ofn denotes a frequency-specific offset for the cell under judgment, Ocn denotes a cell-specific offset for the cell under judgment, and Hys denotes a hysteresis for this event. Ms denotes a measured value of RSRQ/RSRP for a serving cell (in the example shown in FIG. 1, PCell), Ofs denotes a frequency-specific offset for the serving cell, Ocs denotes a cell-specific offset for the serving cell, and Off denotes an offset for this event.

These parameters (Ofn, Ocn, Hys, Ofs, Ocs, Off) associated with the measurement event judgment are defined by the event setting unit 201 of the base station 200, and sent from the base station 200 to a specific terminal 100 via the layer-3 message thereby setting the parameters of the terminal 100.

The RSRQ/RSRP measurement unit 107 of the terminal 100 periodically measures RSRQ/RSRP for each cell using CRS transmitted from the serving cell (the cell being in the on-state), and CRS transmitted from a neighboring cell (in the example shown in FIG. 1, CRS transmitted for the cell #1 being in the on-state) or a discovery signal transmitted from a neighboring cell (in the example shown in FIG. 1, discovery signal transmitted for the cell #2 being in the off-state). Note that RSRQ/RSRP measured using CRS transmitted from the serving cell corresponds to Ms in expression (1).

The offset addition unit 108 of the terminal 100 adds the offset value to RSRQ/RSRP measured by the RSRQ/RSRP measurement unit 107 if the RSRQ/RSRP is measured using the discovery signal. For example, the offset addition unit 108 adds the offset value according to a mathematical expression described below.

$$Mcrs=Mdis+B \quad (2)$$

In expression (2), Mdis denotes a measured value of RSRQ/RSRP measured using the discovery signal, and B denotes the offset value [dB] to be added by the offset addition unit 108. That is, the offset value B is a parameter for use in converting the discovery signal-based RSRQ/RSRP (Mdis) to a value (Mcrs) corresponding to the RSRQ/RSRP measured using CRS.

That is, in a case where a cell being in the off-state is subjected to the measurement event judgment, the judgment unit 109 uses, as Mcrs in expression (1), a value (Mcrs in expression (2)) obtained by adding the offset value (B) to RSRQ/RSRP (Mdis) measured using the discovery signal transmitted from the cell. On the other hand, in a case where a cell being in the on-state is subjected to the measurement event judgment, the judgment unit 109 uses, as Mcrs in expression (1), RSRQ/RSRP measured by the RSRQ/RSRP measurement unit 107 using CRS transmitted from the cell under judgment.

The judgment unit 109 judges whether RSRQ/RSRP of the cell under judgment satisfies a mathematical condition expression given by expression (1), that is, judges whether the measurement event condition is satisfied or not. In a case where the mathematical condition expression given by expression (1) is satisfied, the judgment unit 109 judges that the measurement event condition is satisfied. In this case, the judgment unit 109 reports the occurrence of the event and an identification number (physical cell ID) of the cell under judgment to the base station 200 by using a layer-3 message.

When the base station 200 receives the report of the occurrence of the measurement event via the layer-3 message, the base station 200 triggers a handover to a cell identified by the physical cell ID.

In the present embodiment, as described above, the terminal 100 measures RSRQ/RSRP using a discovery signal transmitted from a neighboring cell, adds the offset value to the discovery signal-based RSRQ/RSRP of the neighboring cell thereby determining a reference signal received quality value corresponding to CRS-based RSRQ/RSRP, and judges whether the calculated reference signal received quality value satisfies the condition for the measurement event (the condition with respect to CRS for trigger a handover).

This makes it possible for the terminal 100 to perform the measurement event judgment using the existing mathematical condition expression even in a case where a cell being in the off-state is subjected to the handover judgment by performing the judgment with respect to RSRQ/RSRP of this cell and RSRQ/RSRP of the serving cell. Thus, even in a case where a cell being in the off-state is detected during the measurement of RSRQ/RSRP of CRS, the terminal 100 does not need to perform re-measurement of RSRQ/RSRP using a discovery signal for the cell for which the measurement of RSRQ/RSRP using CRS has been performed. This prevents the terminal 100 from having a delay in the measurement event judgment, and it is impossible for the base station 200 to trigger a handover without a delay.

Furthermore, also in a case where a discovery signal transmitted for a cell being in the off-state is detected in a situation in which the terminal 100 is connected to a base station that does not support the on/off control (that is, a base station that does not transmit a discovery signal), the terminal 100 is capable of performing the measurement event judgment using the existing mathematical condition expression (the mathematical condition expression with respect to CRS) by making a conversion of the discovery signal-based RSRQ/RSRP. Therefore, even in a case where the terminal 100 is connected to a base station that does not support the on/off control (a base station that does not transmit a discovery signal), the terminal 100 and the base station 200 are capable of performing the handover control based on a comparison event judgment in terms of RSRQ/RSRP measured using a discovery signal.

Furthermore, in the present embodiment, because the terminal 100 triggers the handover according to the existing measurement event judgment (in the present example, Event A3), the base station 200 that receives the handover trigger does not need to change its existing configuration in terms of the handover operation. Thus, when the base station 200 receives the report of the measurement event has occurred from the terminal 100, the base station 200 is capable of triggering the handover with the existing configuration.

According to the present embodiment, as described above, even in the situation in which the discovery signal is introduced, it is possible to perform the handover control according to the existing measurement event without causing a delay.

Variations of First Embodiment

The embodiment has been described above, by way of example, for a case where the comparison event (Event A3) is applied. However, in the embodiment described above, the measurement event is not limited to the comparison event. For example, a threshold event may be applied.

The following description is given, by way of example, for a case where Event A4 (neighbor becomes better than threshold) described in NPL 1 is applied as an example of a threshold event.

More specifically, the judgment unit 109 of the terminal 100 stores a mathematical condition expression for Event A4 given by an expression described below.

$$Mcrs+Ofn+Ocn-Hys>Thresh \quad (3)$$

In expression (3), Thresh denotes a threshold value. Note that a value for a CRS-based RSRQ/RSRP (that is, a value with respect to CRS) to be compared is set to Thresh. The other parameters are similar to those in expression (1).

In a caser where a cell subjected to the measurement event judgment is in the off-state, the offset addition unit 108 of the terminal 100 adds the offset value to the discovery signal-based RSRQ/RSRP according to expression (2), in a similar manner to the embodiment described above.

That is, like the embodiment described above, in a case where a cell being in the off-state is subjected to the measurement event judgment, the judgment unit 109 uses, as Mcrs in expression (3), a value (Mcrs in expression (2)) obtained by adding the offset value (B) to the RSRQ/RSRP (Mdis) measured using the disco very signal transmitted from this cell. On the other hand, in a case where a cell being in the on-state is subjected to the measurement event judgment, the judgment unit 109 uses, as Mcrs in expression (3), a value of RSRQ/RSRP measured by the RSRQ/RSRP measurement unit 107 using CRS transmitted from the cell under judgment.

The judgment unit 109 then judges whether RSRQ/RSRP of the cell under judgment satisfies a mathematical condition expression given by expression (3), that is, judges whether measurement event condition is satisfied. In a case where the mathematical condition expression given by expression (3) is satisfied, the judgment unit 109 judges that the measurement event condition is satisfied.

Because of the above-described difference between CRS and the discovery signal, it is not allowed to perform the threshold event judgment on discovery signal-based RSRQ/RSRP using an existing threshold value with respect to CRS.

To handle the above situation, the terminal 100 calculates a value corresponding to a value of RSRQ/RSRP measured using CRS by adding the offset value to the RSRQ/RSRP measured using the discovery signal. The terminal 100 then uses the existing mathematical condition expression (that is, the mathematical condition expression with respect to CRS). That is, even in threshold event judgment, the terminal 100 uses the existing measurement event judgment (the existing threshold value) for a cell being in the off-state which transmits a discovery signal.

This makes it possible for the terminal 100 to perform the existing threshold event judgment using discovery signal-based RSRQ/RSRP. That is, even in a case where the terminal 100 performs the measurement event judgment using the discovery signal-based RSRQ/RSRP, the base station 200 does not need to set a new threshold value for use for the discovery signal.

Furthermore, because the terminal 100 triggers a handover according to the existing measurement event judgment (in the present example, Event A4), the base station 200 that receives the trigger of the handover does not need to change the existing configuration thereof in terms of the handover operation. Thus, when the base station 200 receives the report of the measurement event has occurred from the terminal 100, the base station 200 is capable of triggering the handover with the existing configuration.

Variations of the first embodiment have been described above.

Although in the variations of the embodiment, the description has been given by way of example for the case where Event A3 or Event A4 described in NPL 1 is applied, the measurement event is not limited to Event A3 and Event A4 as long as the measurement event employed uses at least RSRQ/RSRP of a cell under judgment.

Second Embodiment

In a second embodiment described below, dual connectivity is applied.

Figure 5:
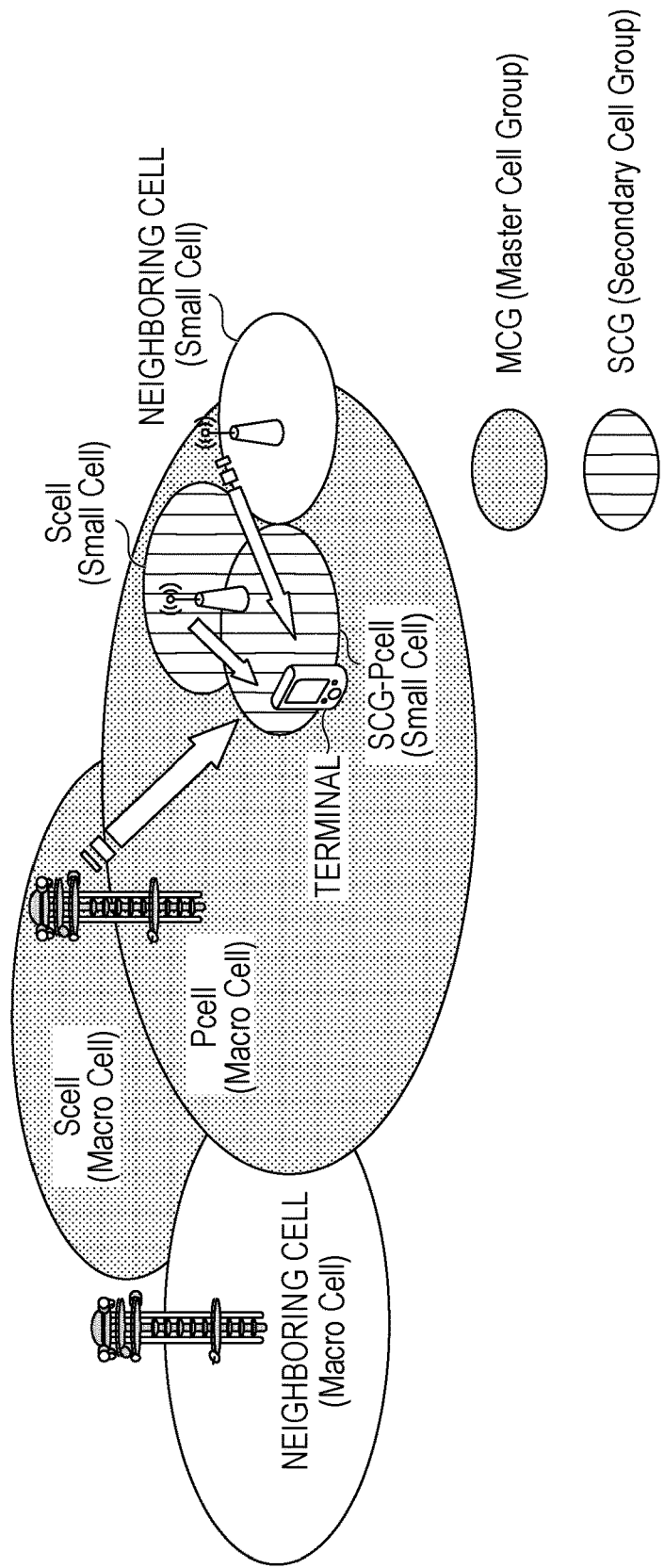
FIG. 5 is a diagram illustrating an example of a configuration of dual connectivity.

In dual connectivity, when a small cell is introduced, a terminal connects to both a macrocell and the small cell using carrier aggregation. FIG. 5 illustrates an example of a configuration of dual connectivity. In the dual connectivity, cells are classified into two groups: a cell group (Master Cell Group (MCG)) including a plurality of base stations (Master eNB (MeNB)) that support a layer-3 terminal control function; and a cell group (Secondary Cell Group (SCG)) including a plurality of base stations (Secondary eNB (SeNB)) other than MeNB. That is, when the dual connectivity is applied, a terminal connects to both MCG and SCG and carrier aggregation is applied to MCG and SCG.

It is under consideration to use a macrocell as MCG and a small cell as SCG as illustrated in FIG. 5 (see, for example, 3GPP TR 36.842 V1.0.0 (2013-11) Study on Small Cell Enhancements for E-UTRA and E-UTRAN Higher layer aspect).

It is under consideration to classify SCG cells into a group of cells that perform only allocation of additional resources to terminals to handle traffic, and a group of cells that have, in addition to the additional resource allocation, a layer-½ control function that allows terminals to transmit a retransmission request or channel quality information (see, for example, 3GPP TSG RAN WG2 meeting, R2-134188, On the need of PCell functionality in SeNB). SCG Cells having the layer-½ control function are called SCG-Primary frequency Cell (SCG-PCell). Note that the control functions of SCG-PCell are now under discussion in 3GPP, and the control functions are not limited to the layer-½ control function.

SCG-PCell is a cell that is added first when a terminal goes into a dual connectivity state. For example, In dual connectivity, there may be a possibility in which a control signal and a user data signal are separated from each other, and the control signal is transmitted by MCG while the user data signal is transmitted by SCG. In this case, if a connection to SCG-PCell is not stable, there is a possibility that transmission of user data is stopped. That is, to maintain dual connectivity, it is necessary to maintain a connection to SeNB and a connection to SCG-PCell. That is, SCG-PCell is an important cell in dual connectivity.

Therefore, to maintain a connection between SeNB and SCG-PCell in dual connectivity, it is necessary to trigger a handover to both SCG-PCell and a neighboring cell. That is, in dual connectivity, a terminal needs to perform a measurement event judgment also for SCG-PCell.

However, in the existing system, the measurement event judgment using the comparison event in terms of handover for SCG-PCell is not completely defined. More specifically, according to the definition of existing carrier aggregation, SCG-P Cell is classified as SCell. In the functionality of the existing measurement event, it is allowed to set a comparison event between PCell (macrocell) and a cell using a frequency different from a frequency used by PCell or it is allowed to set a comparison event between SCell (small cell) and a cell using the same frequency as the frequency used by SCell. However, the specifications of the existing measurement event do not allow it to set a comparison event between SCell (small cell) and a cell using a frequency different from a frequency used by SCell. For example, in FIG. 5, in a case where SCG-PCell and a neighboring cell are using the same frequency, the terminal is capable of judging whether a comparison event condition is satisfied. On the other hand, in a case where SCG-PCell and a neighboring cell are using different frequencies, the terminal is not capable of judging whether the comparison event condition is satisfied.

In the present embodiment, as described below, to handle the above situation, the handover judgment is performed by a method that allows a terminal to perform a comparison event judgment even in a state in which SCG-PCell and a neighboring cell use different frequencies.

FIG. 6 is a block diagram illustrating a configuration of the terminal 300 according to the present embodiment. The configuration shown in FIG. 6 is different from that according to the first embodiment (FIG. 3) in that the offset addition unit 108 and the judgment unit 109 are respectively replaced by an offset addition unit 108a and a judgment unit 109a, and a measurement signal selection unit 301 is additionally provided.

In the terminal 300, the layer-3 message received by the layer-3 message reception unit 105 includes, in addition to information similar that according to the first embodiment, information on setting of the signal (CRS or the discovery signal) used in measuring RSRQ/RSRP, and information on setting of an offset value (B in expression (2)) used by the offset addition unit 108a.

According to the setting of the measurement signal received from the layer-3 message reception unit 105, the measurement signal selection unit 301 specifies a signal (CRS or the discovery signal) to be used by the reception processing unit 102 in measuring RSRQ/RSRP. In response, the reception processing unit 102 extracts a signal according to the setting of the measurement signal, and outputs the extracted signal to the RSRQ/RSRP measurement unit 107.

The offset addition unit 108a adds an offset value according to the setting received from the layer-3 message reception unit 105 to discovery signal-based RSRQ/RSRP received from the RSRQ/RSRP measurement unit 107, and the offset addition unit 108a outputs the resultant RSRQ/RSRP added with the offset value to the judgment unit 109a. For example, the offset addition unit 108a adds the offset value to RSRQ/RSRP according to expression (2) similar to that used in first embodiment.

The judgment unit 109a compares RSRQ/RSRP of SCG-PCell which is a cell connected to the terminal 300 with RSRQ/RSRP of a cell subjected to the measurement event judgment to judge whether a measurement event condition is satisfied. For example, judgment unit 109a performs the measurement event judgment according to expression described below.

$$\text{Mcrs}+\text{Ofn}+\text{Ocn}-\text{Hys}>\text{Mscg}+\text{Ofs}+\text{Ocs}+\text{Off} \qquad (4)$$

In expression (4), Mscg is RSRQ/RSRP measured using CRS transmitted from SCG-PCell. The other parameters (Ofn, Ocn, Hys, Ofs, Ocs, Off) are similar to those in expression (1). However, parameters in a mathematical condition expression in terms of the comparison event shown in expression (4) are expected, unlike the parameters in expression (1) for PCell which is a serving cell, to take values depending on SCG-PCell.

That is, when RSRQ/RSRP of a neighboring cell is greater than RSRQ/RSRP of SCG-PCell (a specific cell subjected to the judgment) measured using CRS the judgment unit 109a judges that the comparison event condition is satisfied.

In the terminal 300, in a case where a cell being in the off-state is subjected to the measurement event judgment, the judgment unit 109a uses, as Mcrs in expression (4), a value (Mcrs in expression (2)) obtained by adding the offset value (B) to RSRQ/RSRP (Mdis) measured using the discovery signal transmitted from the cell. On the other hand, in a case where a cell being in the on-state is subjected to the measurement event judgment, the judgment unit 109a uses, as Mcrs in expression (4), RSRQ/RSRP measured by the RSRQ/RSRP measurement unit 107 using CRS transmitted from the cell under judgment.

FIG. 7 is a block diagram illustrating a configuration of a terminal 400 according to the present embodiment. The configuration shown in FIG. 7 is different from that according to the first embodiment (FIG. 4) in that the event setting unit 201 is replaced by an event setting unit 201 a, and a measurement signal setting unit 401 and an offset value setting unit 402 are additionally provided.

In the terminal 400, the event setting unit 201a sets parameters (Ofn, Ocn, Hys, Ofs, Ocs, Off, etc., in expression (4)) in a mathematical condition expression used by the terminal 300 in measurement event judgment.

The measurement signal setting unit 401 sets a signal (CRS or the discovery signal) used by the terminal 300 in measuring RSRQ/RSRP of the cell under judgment.

The offset value setting unit 402 sets an offset value (B in expression (2)) used, by the terminal 300, as a value to be added to the RSRQ/RSRP measured using the discovery signal.

In the present embodiment, as described above, in addition to the existing measurement event, the measurement event having the mathematical condition expression in terms of the comparison event shown in expression (4) is defined. This makes it possible for the terminal 300 to perform the comparison event judgment even between SCG-PCell and a neighboring cell which are different in frequency, which is impossible in the existing measurement event. Thus, according to the present embodiment, it becomes possible to trigger a handover to a cell which uses a frequency different from that used by SCG-PCell. Thus it is possible to stably maintain dual connectivity.

Furthermore, in the present embodiment, as in the first embodiment, in the case where the RSRQ/RSRP of the cell under judgment is measured using the discovery signal, the value (corresponding to the CRS-based RSRQ/RSRP) obtained by adding the offset value to the discovery signal-based RSRQ/RSRP is used in the measurement event. According to the present embodiment, as with the first embodiment, it is possible to apply the measurement event with respect to CRS without causing a delay even in the situation in which the discovery signal is introduced.

Note that in the embodiment described above, it is assumed by way of example that the base station 400 performs the setting on the terminal 300 in terms of the signal used in measuring the RSRQ/RSRP of the cell under judgment and the offset value B. However, in the present embodiment, the setting described above may be performed by the terminal 300. In this case, the terminal 300 does not need to include the measurement signal selection unit 301, and the base station 400 does not need to include the measurement signal setting unit 401 and the offset value setting unit 402. For example, regarding the offset value B, the terminal 300 may have a table representing the correspondence between the frequency band and the offset value and may determine the offset value B to be used depending on the frequency band. Alternatively, the terminal 300 may determine the signal to be used in measuring RSRQ/RSRP of the cell under judgment by detecting a signal transmitted from the cell under judgment.

The present disclosure has been described above with reference to embodiments.

In the embodiments described above, it is assumed by way of example that the present disclosure is implemented using hardware. However, the present disclosure may be implemented using software in cooperation with hardware.

Each functional block according to the embodiments described above may be typically realized by an integrated circuit such as a LSI. Each of the functional blocks may be formed individually on one chip, or part or all of the functional blocks may formed on one chip. The form of the integrated circuit is not limited to the LSI, but various other types of integrated circuits such as a system LSI, a super LSI, an ultra LSI, and the like may be employed.

Furthermore, the integrated circuit is not limited to the LSI, but the integrated circuit may be realized in the form of a dedicated circuit, a general-purpose processor, or the like. The integrated circuit may also be realized using a field programmable gate array (FPGA) LSI that is allowed to be programmed after the production of the LSI is completed, or a reconfigurable processor that is allowed to be reconfigured in terms of the connection or the setting of circuit cells in the inside of the LSI after the production of the LSI is completed.

When a new integration circuit technique other than LSI techniques are realized in the future by an advance in semiconductor technology or related technology, the functional blocks may be realized using such a new technique. A possible example of a new technique is biotechnology.

As described above, the present disclosure provides a terminal comprising: a measurement unit that measures a first received quality value by using a cell-specific reference signal transmitted from a neighboring cell or a second received quality value by using a cell-detection reference signal transmitted from the neighboring cell, an addition unit that calculates a third received quality value by adding an offset value to the second received quality value, a judgment unit that judges whether the first received quality value of the neighboring cell or the third received quality value satisfies a handover triggering condition with respect to the cell-specific reference signal, and a transmitter that transmits trigger information to the neighboring cell in order to activate handover from a serving cell to the neighboring cell, based on the judgement results.

In the terminal according to the present disclosure, if the first received quality value or the third received quality value is greater than a received quality value of the serving cell measured using a cell-specific reference signal that is transmitted from the serving cell, the judgment unit may judge that the handover triggering condition is satisfied.

In the terminal according to the present disclosure, if the first received quality value or the third received quality value is greater than a threshold value with respect to the cell-specific reference signal, the judgment unit may judge that the handover triggering condition is satisfied.

In the terminal according to the present disclosure, in dual connectivity in which the terminal connects to both a first group of macrocells and a second group of small cells, the serving cell is a specific cell having a layer control function and belonging to the second group, and wherein if the first received quality value or the third received quality value is greater than a received quality value of the specific cell measured using a cell-specific reference signal transmitted from the serving cell, the judgment unit judges that the handover triggering condition is satisfied.

The present disclosure also provides a handover judgement method comprising: measuring a first received quality value by using a cell-specific reference signal transmitted from a neighboring cell or a second received quality value by using a cell-detection reference signal transmitted from the neighboring cell, calculating a third received quality value by adding an offset value to the second received quality value, and judging whether the first received quality value of the neighboring cell or the third received quality value satisfies a handover triggering condition with respect to the cell-specific reference signal, and transmitting trigger information to the neighboring cell in order to activate handover from a serving cell to the neighboring cell, based on the judgement results.

The present disclosure is useful in mobile communication systems.

What is claimed is:

1. A terminal, comprising:
   circuitry, which, in operation,
      when a cell-specific reference signal is received from a neighboring cell, measures a first received quality value using the cell-specific reference signal transmitted by the neighboring cell and determines whether the first received quality value satisfies a handover triggering condition;
      when a discovery signal is received from the neighboring cell, measures a second received quality value by using the discovery signal transmitted by the neighboring cell, calculates a third received quality value by adding an offset value to the second received quality value and determines whether the third received quality value satisfies the handover triggering condition, wherein the discovery signal is a reference signal for detecting a small-cell in an OFF-state; and
      generates triggering information based on determination results of whether the first received quality value satisfies a handover triggering condition or whether the third received quality value satisfies the handover triggering condition; and
   a transmitter, coupled to the circuitry, and which, in operation, transmits the generated trigger information to the neighboring cell to activate handover from a serving cell to the neighboring cell.

2. The terminal according to claim 1, wherein if the first received quality value or the third received quality value is greater than a received quality value of the serving cell measured using a cell-specific reference signal that is transmitted by the serving cell, the circuitry determines that the handover triggering condition is satisfied.

3. The terminal according to claim 1, wherein if the first received quality value or the third received quality value is greater than a threshold value with respect to a cell-specific reference signal transmitted by the serving cell, the circuitry determines that the handover triggering condition is satisfied.

4. The terminal according to claim 1, wherein in dual connectivity in which the terminal connects to both a first group of macrocells and a second group of small cells, the serving cell is a specific cell having control function for transmitting a retransmission request or channel quality information, and belonging to the second group, wherein if the first received quality value or the third received quality value is greater than a received quality value of the specific cell measured using a cell-specific reference signal transmitted from the serving cell, the circuitry determines that the handover triggering condition is satisfied.

5. A handover determination method, comprising:

in response to receipt of a cell-specific reference signal transmitted by a neighboring cell, measuring a first received quality value by using the cell-specific reference signal transmitted by the neighboring cell and determining whether the first received quality value satisfies a handover triggering condition;

in response to receipt of a discovery signal transmitted by the neighboring cell, measuring a second received quality value by using the discovery signal transmitted by the neighboring cell, calculating a third received quality value by adding an offset value to the second received quality value, and determining whether the third received quality value satisfies the handover triggering condition; and transmitting trigger information to the neighboring cell to activate handover from the serving cell to a neighboring cell, based on determination results.

* * * * *